(12) United States Patent
Zhang et al.

(10) Patent No.: US 9,842,247 B2
(45) Date of Patent: Dec. 12, 2017

(54) EYE LOCATION METHOD AND DEVICE

(71) Applicant: Beijing Techshino Technology Co., Ltd., Beijing (CN)

(72) Inventors: Qinqin Zhang, Beijing (CN); Xiangde Zhang, Beijing (CN); Yaoluo Zhang, Beijing (CN); Qianying Li, Beijing (CN)

(73) Assignee: BEIJING TECHSHINO TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/030,485

(22) PCT Filed: Aug. 14, 2014

(86) PCT No.: PCT/CN2014/084429
§ 371 (c)(1),
(2) Date: Apr. 19, 2016

(87) PCT Pub. No.: WO2015/067084
PCT Pub. Date: May 14, 2015

(65) Prior Publication Data
US 2016/0253550 A1    Sep. 1, 2016

(30) Foreign Application Priority Data
Nov. 11, 2013   (CN) .......................... 2013 1 0557045

(51) Int. Cl.
*G06K 9/00* (2006.01)
*G06K 9/52* (2006.01)
(Continued)

(52) U.S. Cl.
CPC ....... *G06K 9/00281* (2013.01); *G06K 9/0061* (2013.01); *G06K 9/00248* (2013.01); *G06K 9/00604* (2013.01); *G06K 9/4604* (2013.01); *G06K 9/4619* (2013.01);
(Continued)

(58) Field of Classification Search
CPC .... G06K 9/00281; G06K 9/52; G06K 9/0061; G06T 7/0042; G06T 7/606
USPC ...................................................... 382/203
See application file for complete search history.

(56) References Cited

U.S. PATENT DOCUMENTS 5,982,912 A    11/1999   Fukui et al.
2009/0060383 A1    3/2009   Li et al.
(Continued)

FOREIGN PATENT DOCUMENTS

CN    101059836 A    10/2007
CN    101533466 A    9/2009
(Continued)

OTHER PUBLICATIONS

D'Orazio et al: "An algorithm for real time eye detection in face images", IEEE, 2004.*
(Continued)

*Primary Examiner* — Ruiping Li
(74) *Attorney, Agent, or Firm* — Shumaker, Loop & Kendrick, LLP; James D. Miller

(57) ABSTRACT

An eye location method and device includes: receiving a face image; locating a position of a nose and positions of eyes in the face image; determining a facial symmetry axis according to the position of the nose; and regulating the positions of the eyes by the facial symmetry axis to obtain target positions of the eyes. By the method and the device, the problem of poorer eye location accuracy in the conventional art is solved, and the effect of improving eye location accuracy is further achieved.

14 Claims, 4 Drawing Sheets

(51) Int. Cl.
  *G06T 11/60* (2006.01)
  *G06K 9/62* (2006.01)
  *G06K 9/46* (2006.01)

(52) U.S. Cl.
  CPC ............ *G06K 9/52* (2013.01); *G06K 9/6269* (2013.01); *G06T 11/60* (2013.01); *G06K 2009/4666* (2013.01); *G06T 2207/20024* (2013.01); *G06T 2207/20221* (2013.01); *G06T 2207/30201* (2013.01)

(56) References Cited

U.S. PATENT DOCUMENTS

2013/0202159 A1* 8/2013 Jeon ................... G06K 9/00268
  382/116
2014/0118696 A1* 5/2014 Schuhrke ................ A61B 3/111
  351/206

FOREIGN PATENT DOCUMENTS

| CN | 101615292 A | 12/2009 |
| CN | 102129553 A | 7/2011 |
| CN | 103093215 A | 5/2013 |
| CN | 103632136 A | 3/2014 |

OTHER PUBLICATIONS

Zheng et al, "A robust method for eye features extraction on color image", Pattern Recognition Letters 26, 2005.*

* cited by examiner

EYE LOCATION METHOD AND DEVICE

CROSS-REFERENCES TO RELATED APPLICATIONS

This patent application is a United States national phase patent application based on PCT/CN2014/084429 filed on Aug. 14, 2014, which claims the benefit of Chinese Patent Application No. 201310557045.4 filed on Nov. 11, 2013. The entire disclosures of the above patent applications are hereby incorporated herein by reference.

TECHNICAL FIELD

The disclosure relates to the field of image processing, and in particular to an eye location method and device.

BACKGROUND OF THE INVENTION

Under a normal condition, a complete face recognition system consists of four parts, i.e. face detection, eye location, feature extraction and face recognition. In a recognition process, no matter whether a global feature or local feature of a face is utilized or a geometric feature or an algebraic feature of an image is adopted, a change in an orientation of the face may greatly influence a recognition result, and thus, normalization processing on the image is required before recognition. A condition for image normalization includes positions of eyes, for specific reasons as follows:

1) a distance between centres of the eyes is minimally influenced by light and expression changes, and a direction of a connecting line of the centres of the eyes is deflected along with turning of the face, and may be used as a basis for image rotation; and 2) each extracted feature value is normalized by a distance between the eyes, and then these feature values are invariable in translation, rotation and scale.

On the premise that a position of a face has been detected, whether eyes are accurately located or not directly influences a feature extraction effect to further influence face recognition accuracy, so that current scholars locate accuracy of eyes as a key and bottleneck of development of face recognition to practicability.

Early face recognition algorithms are all implemented on the premise that coordinates of eyes are supposed to be accurately located. In the last few decades, researches on eye location methods have been greatly developed, and researchers at home and abroad proposed some eye location methods, which may substantially be divided into the following five types:

(1) A Prior-Rule-Based Method:

the prior-rule-based method is also called a knowledge-based method, and mainly summarizes features of a face into some simple rules, these rules reflect relationships between a peculiar attribute of the face and each facial feature of the face, and for example, the face is central symmetric. Candidate points or areas of the eyes may be approximately determined according to these relationships, and then corresponding processing is performed.

The prior-rule-based method is simple and rapid, but is only effective for a face image with a simpler background and regular facial features. For accurately locating the eyes, other methods for eliminating interference, such as eyebrows, eyeglasses and eyelashes, are also required.

(2) A Geometric-Information-Based Method:

since positions and distances of each organ on the face are relatively fixed, a geometric model of the face may be established according to a distribution rule of the organs on the face, and then positions of each facial feature point are matched in the face image.

The geometric-information-based method has higher requirements on template selection and model construction, and a great amount of geometric position information of the face is utilized, which may cause a poor effect of location under a complex condition. Therefore, an existing face recognition system usually implements location by another method under the assistance of the geometric-information-based method.

(3) A Skin Colour Information-Based Method:

colour information has been more and more applied to the field of researches on computer vision. A skin colour is important information of the face, is completely independent of a detailed feature of the face, is applicable to a change condition of rotation, an expression, a pose and the like, and is relatively stable. The skin colour is different from colours of most of background objects to a certain extent, and utilizing the skin colour may reduce eye searching time and reduce interference of a complex background to eye location.

The skin colour information-based method is simple and rapid, but is easily influenced by an external light source, image acquisition equipment and the like, and may cause phenomena of light reflection of the face image, image colour abnormity and the like to cause incapability of the system in better distinguishing skin colour and non-skin colour pixels. Moreover, skin colour information may only be configured for a colour image, may not be configured for processing of a greyscale image, and is not so universal.

(4) A Statistical-Information-Based Method:

the statistical-information-based method usually obtains a group of training classifiers by training and learning of a great number of target samples and non-target samples, and then performs target detection according to these classifiers.

The statistical-information-based method for eye location is greatly improved in accuracy, but a great number of samples are required to be manufactured in advance for training, a training process is complex, and a period is long.

(5) An Associated-Information-Based Method:

the associated-information-based method continuously narrows a range of the candidate points of the eyes by relative position data of other organs on the face, thereby implementing eye location.

The associated-information-based method utilizes a restriction relationship among feature points of the face, is improved in location accuracy along with increase of restriction conditions, and is well adapted to a complex background, face pose and expression change and the like, but at the same time of improving the accuracy, operation of an algorithm is also increased, and a location speed is reduced.

However, the eye location methods in a related technology all have similar defects: 1) states of the eyes are different when the eyes are opened and closed, the eyes in an image where the eyes are opened are easy to locate because the image includes pupils, only a "black line" is formed in an image where the eyes are closed, positions of the eyes in the images in the two states have different feature and greyscale distribution, it is difficult to find common features if the same methods are adopted for location, for example, template matching, adoption of the same methods for location may easily cause false location, the existing eye location methods hardly ever classify the eye states, and different location methods should be adopted for different eye states; and 2) most of the existing eye location methods only purely locate the eyes on the face, but actually, eye location may also be interfered by eyebrows, canthi and the like sometimes, and although the eyebrows or the canthi are located, such an obvious error may not be corrected.

For the problem of poorer eye location accuracy in the related technology, there is yet no effective solution.

SUMMARY OF THE INVENTION

A main purpose of the disclosure is to provide an eye location method and device, so as to solve the problem of poorer eye location accuracy in a conventional art.

According to one aspect of the disclosure, an eye location method is provided, which includes that: receiving a face image; locating a position of a nose and positions of eyes in the face image; determining a facial symmetry axis according to the position of the nose; and regulating positions of the eyes to obtain target positions of the eyes by the facial symmetry axis.

According to the other aspect of the disclosure, an eye location device is provided, which includes: a receiving unit, configured to receive a face image; a locating unit, configured to locate a position of a and positions of eyes in the face image; a first determining unit, configured to determine a facial symmetry axis according to the position of the nose; and a regulating unit, configured to regulate the positions of the eyes to obtain target positions of the eyes by the facial symmetry axis.

According to the disclosure, the face image is received; the position of the nose and positions of the eyes in the face image are located; the facial symmetry axis is determined according to the position of the nose; and the positions of the eyes are regulated to obtain the target positions of the eyes by the facial symmetry axis. The facial symmetry axis is determined by locating the nose, and the positions of the eyes are regulated to locate the eyes by the facial symmetry axis, so that the problem of poorer eye location accuracy in the conventional art is solved, and the effect of improving eye location accuracy is further achieved.

BRIEF DESCRIPTION OF THE DRAWINGS

The drawings forming a part of the invention are adopted to provide further understanding of the invention, and schematic embodiments of the invention and description thereof are adopted to explain the invention and not intended to form improper limits to the invention. In the drawings.

DETAILED DESCRIPTION OF THE EMBODIMENTS

It is important to note that the embodiments in the invention and characteristics in the embodiments can be combined under the condition of no conflicts. The invention will be described below with reference to the drawings and the embodiments in detail.

The embodiment of the invention provides an eye location method, and the eye location method provided by the embodiment of the invention will be specifically introduced below.

Figure 1:
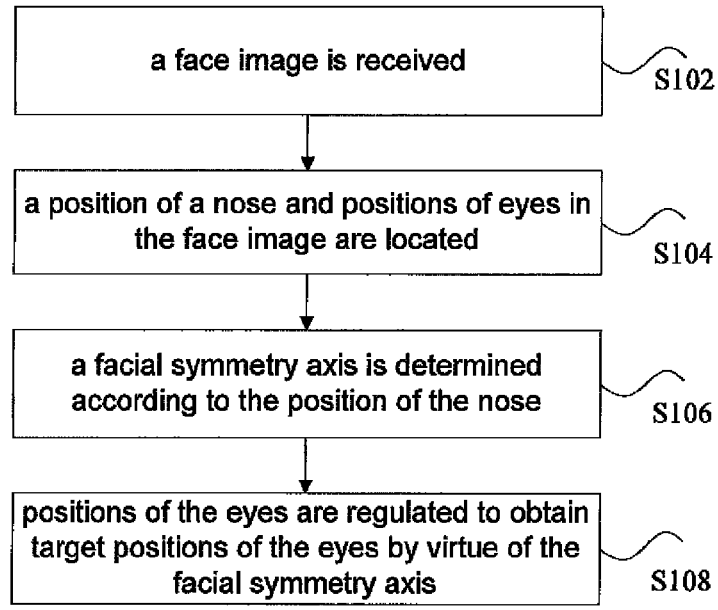
FIG. 1 is a flowchart of an eye location method according to an embodiment of the invention.

FIG. 1 is a flowchart of an eye location method according to an embodiment of the invention, and as shown in FIG. 1, the method mainly includes the following Step 102 to Step 108:

Step 102: a face image is received, wherein the face image may be a plane image transmitted in any manner;

Step 104: a position of a nose and positions of eyes in the face image are located;

Step 106: a facial symmetry axis is determined according to a position of the nose, wherein each organ is symmetrically distributed on the face, so that the facial symmetry axis undoubtedly passes through the nose, and the eye location method provided by the embodiment of the invention determines the facial symmetry axis according to the position of the nose; and Step 108: positions of the eyes are regulated to obtain target positions of the eyes by the facial symmetry axis.

According to the eye location method of the embodiment of the invention, the eyes are located by locating the nose, determining the facial symmetry axis and regulating the positions of the eyes by the facial symmetry axis, so that the problem of poorer eye location accuracy in the conventional art is solved, and the effect of improving eye location accuracy is further achieved.

Figure 2:
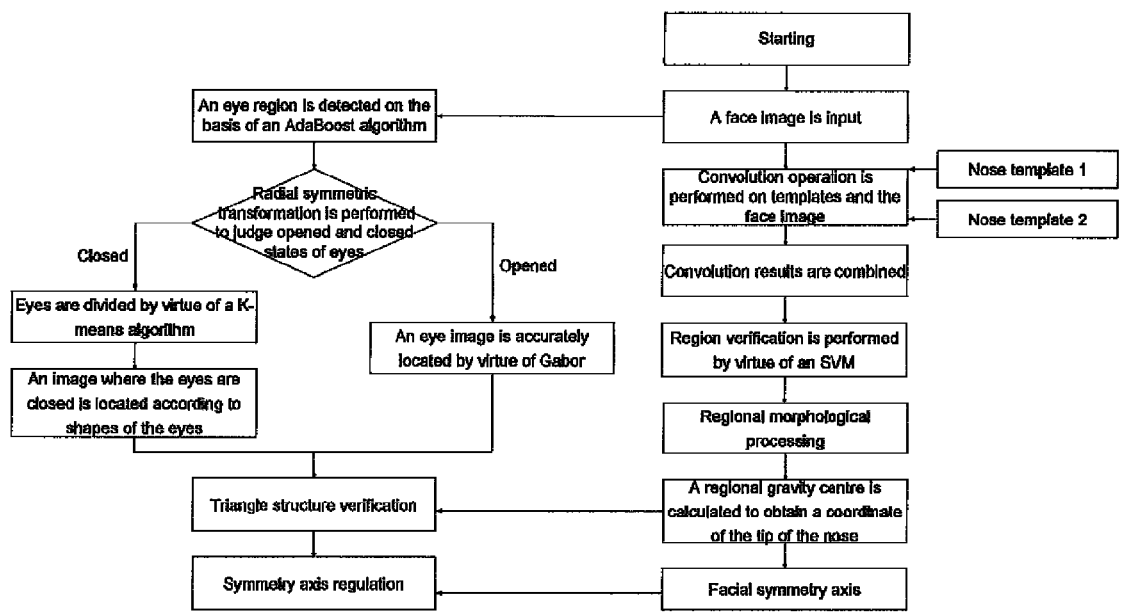
FIG. 2 is a flowchart of an eye location method according to a preferred embodiment of the invention.

Step 104 to Step 108 will be specifically described below with reference to the eye location method of a preferred embodiment of the invention shown in FIG. 2, specifically as shown in FIG. 2:

In the embodiment of the invention, convolution calculation may be performed by a preset nose template image and the face image, and filtering may be performed by a Support Vector Machine (SVM) to locate the nose in the face image. Specific description will be given below.

Figure 3A:
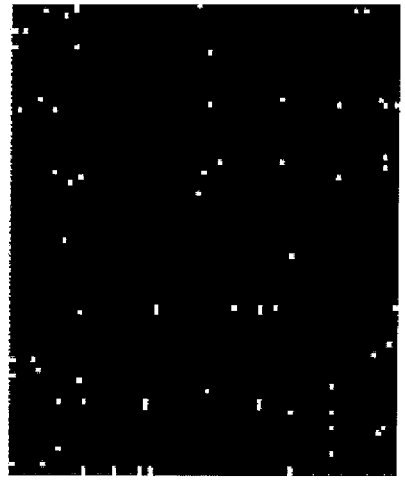
FIGS. 3A to 3C are diagrams of a binary image determined by an eye location method in FIG. 2.
Figure 3B:
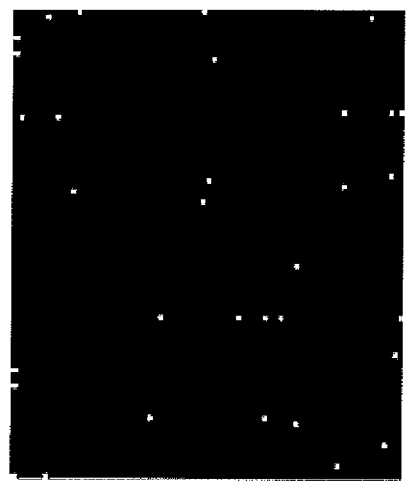
Figure 3C:
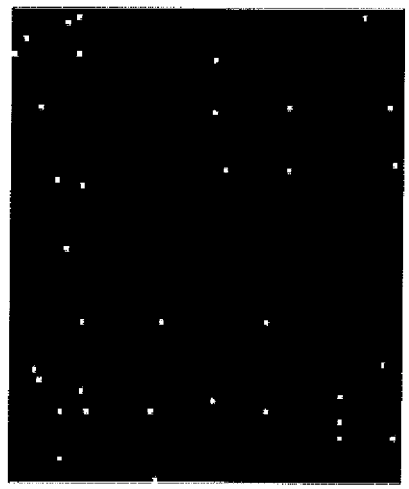

Preferably, the nose may have two different states in the face image when a person raises the head and lowers the head, so that a specific manner for locating the nose is specifically described schematically with the condition that the preset nose template image includes a first template image and a second template image as an example in the embodiment of the invention, wherein nostril angles in the first template image are different from nostril angles in the second template image, that is, one of angles of nostril lines in the two template images relative to a horizontal plane is large, and the other is small. The specific manner for locating the nose in the face image by convolution calculation of the preset nose template image and the face image is implemented as follows:

first, convolution calculation is performed by the face image and the first template image to obtain a first convolution image, convolution calculation is performed by the face image and the second template image to obtain a second convolution image, i.e. F_nose=F_img*nose, wherein the first convolution image is an image obtained by convolution calculation of the first template image and the face image, the second convolution image is an image obtained by convolution calculation of the second template image and the face image, F_img is the face image, nose is a nose template, and F_nose is a convolution image obtained by convolution with the nose template;

then, regional maximums of the two convolution images are calculated, and binary images, called a first binary image and a second binary image respectively, of the two convolution images are correspondingly obtained by marking positions with the regional maximums into 1 and marking other points (i.e. positions without the regional maximums) into 0 on the convolution images, wherein it is supposed that an acute angle in included angles between the nostril lines and vertical line in the first template image is larger than an acute angle in included angles between the nostril lines and vertical line in the second template image, that is, the first template image represents the state of the nose when the person raises the head and the second template image represents the state of the nose when the person lowers the head, the obtained binary image of the first convolution image is shown in FIG. 3A, and the obtained binary image of the second convolution image is shown in FIG. 3B, wherein the regional maximums refer to local region grey-scale maximums in the images;

next, the first binary image and the second binary image are combined to obtain a third binary image, as shown in FIG. 3C, wherein white points in FIG. 3A, FIG. 3B and FIG. 3C represent the positions with the regional maximums, and combination refers to extraction of a union of the two binary images; and finally, a regional gravity centre of positions with a regional maximum in the third binary image is determined as the position of the nose.

In the conventional art, when the nose is located, a template matching method is usually adopted, and a maximum point of a template matching coefficient is directly calculated as the position of the nose. While in the embodiment of the invention, the convolution images of the face image and the template images are calculated to obtain a matching coefficient at first, then the positions with the regional maximums in the convolution images are calculated, the positions with the regional maximums are candidate points of the position of the nose, and the regional gravity centre of the positions with the regional maximum is further determined as the position of the nose. Compared with location of the nose in the conventional art, location of the nose in the embodiment of the invention has the advantages that the candidate points of the position of the nose may be accurately screened and nose location accuracy may be improved.

It is important to note that the abovementioned manner for determining the position of the nose is not limited to whether convolution calculation between the first template image and the face image or convolution calculation between the second template image and the face image is performed at first, that is, the determination manner may be implemented in a sequence of sequentially executing Step 11 to Step 18 according to the following manner 1, and may also be implemented in a sequence of sequentially executing Step 21 to Step 28 according to the following manner 2.

Manner 1:

Step 11: convolution calculation is performed on the first template image and the face image to obtain the first convolution image;

Step 12: the regional maximum of the first convolution image is calculated;

Step 13: the binary image of the first convolution image is obtained by marking the positions with the regional maximum in the first convolution image into 1 and marking the positions without the regional maximum into 0;

Step 14: convolution calculation is performed on the second template image and the face image to obtain the second convolution image;

Step 15: the regional maximum of the second convolution image is calculated;

Step 16: the binary image of the second convolution image is obtained by marking the positions with the regional maximum in the second convolution image into 1 and marking the positions without the regional maximum in the second convolution image into 0;

Step 17: the first binary image and the second binary image are combined to obtain the third binary image, wherein the first binary image is the binary image of the first convolution image, and the second binary image is the binary image of the second convolution image; and Step 18: the regional gravity centre of the positions with the regional maximum in the third binary image is determined as the position of the nose.

Manner 2:

Step 21: convolution calculation is performed on the second template image and the face image to obtain the second convolution image;

Step 22: the regional maximum of the second convolution image is calculated;

Step 23: the binary image of the second convolution image is obtained by marking the positions with the regional maximum in the second convolution image into 1 and marking the positions without the regional maximum in the second convolution image into 0;

Step 24: convolution calculation is performed on the first template image and the face image to obtain the first convolution image;

Step 25: the regional maximum of the first convolution image is calculated;

Step 26: the binary image of the first convolution image is obtained by marking the positions with the regional maximum in the first convolution image into 1 and marking the positions without the regional maximum into 0;

Step 27: the first binary image and the second binary image are combined to obtain the third binary image, wherein the first binary image is the binary image of the first convolution image, and the second binary image is the binary image of the second convolution image; and Step 28: the regional gravity centre of the positions with the regional maximum in the third binary image is determined as the position of the nose.

Furthermore, in the embodiment of the disclosure, the regional gravity centre may specifically be determined in a manner as follows:

first, morphological dilate processing is performed on the third binary image to obtain multiple connected regions by a preset matrix $$\begin{bmatrix} 0 & 0 & 1 & 0 & 0 \\ 0 & 1 & 1 & 1 & 0 \\ 1 & 1 & 1 & 1 & 1 \\ 0 & 1 & 1 & 1 & 0 \\ 0 & 0 & 1 & 0 & 0 \end{bmatrix};$$

then, the multiple connected regions are searched for the largest connected region; and finally, a gravity centre of the largest connected region is determined as the regional gravity centre.

Preferably, after the first binary image and the second binary image are combined to obtain the third binary image and before the regional gravity centre of the positions with the regional maximum in the third binary image is determined as the position of the nose, the SVM is utilized for filtering in a manner as follows:

target points are judged by the SVM, wherein the target points are points which are marked 1 in the third binary image; under the condition that the target points are determined to be still 1 by the SVM, the target points are kept to be marked into 1 in the third binary image; and under the condition that the target points are determined to be 0 by the SVM, the target points are remarked into 0 in the third binary image, wherein the regional gravity centre of the positions with the regional maximum in the third binary image which is remarked is determined as the position of the nose.

Preferably, training of the SVM is to obtain a parameter of an optimal classification plane by training according to samples of a known type. For a problem of binary classification, the SVM outputs a label of +1 or −1 during judgment, +1 represents a positive sample during training, and −1 represents a negative sample during training. In the embodiment of the invention, a specific method for judging the target points by the SVM is implemented as follows:

first, greyscale features of samples are loaded into a training function of the SVM, and training is performed to obtain classifiers, wherein a specific method for obtaining the classifiers is the same as a manner of loading the greyscale features into the training function to obtain the classifiers in the conventional art, and will not be elaborated herein, wherein the samples include positive samples and negative samples, the positive samples are nose regions captured from a standard face image in advance, and the negative samples are non-nose region captured from the standard face image in advance; and then, images are captured from the face image according to proportions by taking the points with a value of 1 in the third binary image as centres, greyscale features of the images are loaded into the classifiers obtained by the SVM in the abovementioned step for judgment, the corresponding points in the third binary image are marked into 1 if judgment results are 1, and the corresponding points in the third binary image are marked into 0 if the judgment results are 0, wherein the proportions are the same as proportions of the samples in the standard face image in the abovementioned step.

After the SVM is utilized for judgment, part of the candidate points are further excluded, and most of the other candidate points are gathered in the vicinity of the nose, so that nose location accuracy is further improved.

Preferably, before the nose is located, the eye location method of the embodiment of the invention may further includes a method of normalizing the face image into a first preset size (for example, height×width=90 pixels×75 pixels) and then performing nose location on the basis of the face image which is normalized into the preset size.

Since the nose is distributed on the face according to a certain proportion, the face is normalized into a certain size before the nose is located. In such a manner, influence of the size is not required to be considered in subsequent processing, and the location speed is increased.

A specific manner for locating the eyes in the face image in the embodiment of the invention will be specifically described below.

1: A first region where the eyes are located in the face image is detected by an AdaBoost algorithm, and a specific detection manner is the same as an algorithm for detecting a region where the eyes are located by the AdaBoost algorithm in the conventional art, wherein a specific training process of the AdaBoost algorithm is as follows:

(a) all the training samples (including the positive samples and the negative samples) are normalized into the same size, and feature values, corresponding to all eye feature templates, of the face image are calculated, thereby obtaining a feature set, wherein the positive samples refer to eye samples, and the negative samples refer to non-eye samples or samples including part of the eyes;

(b) an optimal threshold value is determined according to the calculated feature set and a weak classifier training algorithm, and a weak classifier set is obtained;

(c) under the condition that a given detection rate and false detection rate are met, optimal weak classifiers are selected from the weak classifier set to form strong classifiers according to a strong classifier training algorithm;

(d) the obtained strong classifiers are combined into a cascaded classifier; and (e) the samples which are falsely determined into the eyes in a non-eye sample set are screened by the obtained cascaded classifier, and then the non-eye samples are supplemented for subsequent training.

By the abovementioned process, the classifiers detecting eye regions on the face image may be obtained, thereby laying a foundation for subsequent work to accurately detect the first region where the eyes are located in the face image.

Preferably, in the embodiment of the invention, training in Step (a) to Step (e) may be repeated until the preset detection rate and false detection rate are met, and the classifiers detecting the eye regions in the face image are obtained.

Preferably, in a process of detecting the first region, the left eye may be detected only on the face at a left upper part of the face image, and the right eye may be detected only on the face at a right upper part of the face image.

Since the positions of the eyes on the face are relatively fixed, during detection, the left eye may be detected only on the face at the left upper part, and similarly, the right eye may be detected on the face at the right upper part; and in such a manner, interference of the nose and a mouth may be eliminated, and the detection speed may also be increased.

Preferably, before the first region is detected, the eye location method of the embodiment of the invention further includes a method of normalizing the face image into a second preset size (for example, height×width=65 pixels×65 pixels) and then detecting the first region on the basis of the face image which is normalized into the second preset size.

Since a size of the face is obtained by face detection and sizes of the eye regions have certain proportional relationships with the size of the face, the face image is normalized into the second preset size, the eye regions are all in the same scale (about height×width=10 pixels×20 pixels), and then the features of the face are only required to be calculated once under such a size.

2: radial symmetric transformation is performed on the first region to determine opened or closed states of the eyes, wherein radial symmetric transformation is a simple and rapid gradient-based target detection operator developed on the basis of general symmetric transformation. Transformation mainly highlights a round and symmetric region by a feature of radial symmetry, thereby implementing detection of a round target and further determining the opened or closed states of the eyes by a radial symmetric transformation method.

Figure 4:
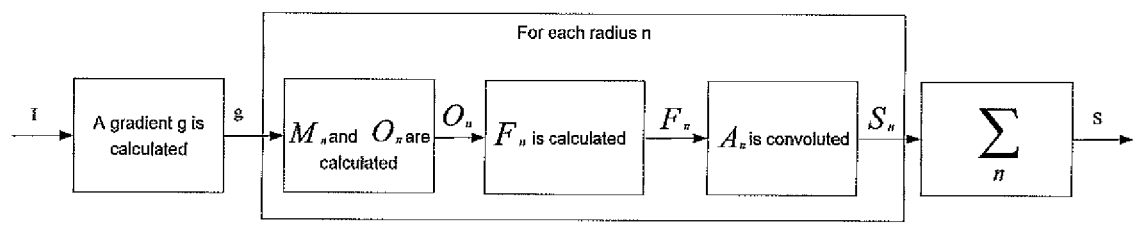
FIG. 4 is a flowchart of radial symmetric transformation of an eye location method according to an embodiment of the invention.

A radial symmetric transformation algorithm is shown in FIG. 4, as shown in FIG. 4:

4.1: horizontal edge extraction is performed on a first region image I at first, then vertical edge extraction is performed on I to obtain a gradient image, and for each pixel p in the gradient image, two corresponding mapping points $p_{+ve}(p)$ and $p_{-ve}(p)$ on a gradient direction $g(p)$ may be calculated:

$$p_{+ve}(p) = p + \text{round}\left(\frac{g(p)}{\|g(p)\|}n\right), \qquad (4\text{-}1)$$

$$p_{-ve}(p) = p - \text{round}\left(\frac{g(p)}{\|g(p)\|}n\right), \qquad (4\text{-}2)$$

where $g(p)=[g_x(p),g_y(p)]$ is a gradient vector of the pixel p, $\|g(p)\|$ represents an amplitude of the vector, and n is a detection radius.

4.2: A gradient direction mapping histogram $O_n$ and gradient amplitude mapping histogram $M_n$ of the first region image I are calculated, and when the detection radius is 2, a specific calculation manner is as follows:

$$O_n(p_{+ve}(p))=O_n(p_{+ve}(p))+1 \qquad (4\text{-}3),$$

$$O_n(p_{-ve}(p))=O_n(p_{-ve}(p))-1 \qquad (4\text{-}4)$$

$$M_n(p_{+ve}(p))=M_n(p_{+ve}(p))+\|g(p)\| \qquad (4\text{-}5)$$

$$M_n(p_{-ve}(p))=M_n(p_{-ve}(p))-\|g(p)\| \qquad (4\text{-}6)$$

where $O_n$ and $M_n$ are required to be initialized to be 0 before calculation of each time, a numerical value of $O_n$ at a $p_{+ve}(p)$ point is increased by 1, a numerical value of $O_n$ at a $p_{-ve}(p)$ point is decreased by 1, a numerical value of $M_n$ at the $p_{+ve}(p)$ point is increased by $\|g(p)\|$, a numerical value of $M_n$ at the $p_{-ve}(p)$ point is decreased by $\|g(p)\|$, the values in the gradient direction mapping histogram $O_n$ reflect the numbers of surrounding pixels mapped to the points along the gradient direction, and the values in the gradient amplitude mapping histogram $M_n$ reflect contributions of gradient amplitudes of the surrounding pixels to the points; and when the detection radius is n, a radial symmetric transformation result may be obtained by the following convolution calculation:

$$S_n = F_n * A_n, \qquad (4\text{-}7)$$

$$F_n(p) = \frac{M_n(p)}{k_n}\left(\left|\frac{O_n(p)}{k_n}\right|\right)^\alpha, \qquad (4\text{-}8)$$

where $A_n$ is a two-dimensional Gaussian window, $\alpha$ is a control parameter, $k_n$ is a scale operator configured to normalize $O_n$ and $M_n$ under different radiuses, and moreover, $$O_n(p) = \begin{cases} O_n(p) & \text{if } O_n^{(p)} < k_n \\ k_n & \text{otherwise} \end{cases}, \qquad (4\text{-}9)$$

$$k_n = \begin{cases} 8 & \text{if } n = 1 \\ 9.9 & \text{otherwise} \end{cases}. \qquad (4\text{-}10)$$

4.3: A final transformation result is obtained by averaging a sum of radial symmetric transformation results $S_n$ obtained under all the detection radiuses:

$$S = \frac{1}{|N|}\sum_{n\in N} S_n. \qquad (4\text{-}11)$$

Preferably, before radial symmetric transformation is performed on the first region to determine the opened or closed states of the eyes, the eye location method of the embodiment of the invention further includes that: whether an average greyscale value of the first region is smaller than a preset value or not is judged, and under the condition that the average greyscale value of the first region is determined to be smaller than the preset value, logarithmic transformation is performed on a greyscale value of an eye image represented by the first region, wherein logarithmic transformation may specifically be performed by adopting formula I=c*log (1+I_eye), where I_eye represents an original greyscale value of the eye image, I represents a greyscale value of the eye image after logarithmic transformation, c is a constant, c=1 in the embodiment of the invention, and in the embodiment of the invention, the preset value may be 115, and may also be a numerical value about 115 according to a practical requirement.

Logarithmic transformation is performed on the eye image with a smaller greyscale value to narrow a dynamic range, and such regulation over the greyscale range of the image may alleviate the phenomenon of non-uniform light on the image, enhance image details of a dark region and further ensure subsequent eye location accuracy.

3: Under the condition that the eyes are determined to be in the opened state, the eyes are located by a Gabor filter, that is, the opened eyes are accurately located on the basis of an adapted round Gabor, wherein a polar coordinate of the Gabor filter is:

$$G(r,\theta)=e^{-i\omega(\theta-\theta_0)}e^{-(r-r_0)^2/\alpha^2}e^{-(\theta-\theta_0)^2/\beta^2}.$$

From the above formula, a real part of the Gabor filter is evenly symmetric, the Gabor filter is a product of a two-dimensional Gaussian function and a complex exponent, $r_0$ and $\theta_0$ are parameter factors determining a centre of the Gabor filter, $\alpha$ and $\beta$ are scale factors of the Gaussian window in the Gabor filter, and a series of parameters may be regulated to obtain filters of different scales, frequencies and directions. In the embodiment of the invention, $\alpha$ and $\beta$ are determined according to the size of the face image, and $\omega$ is an oscillating frequency of the Gabor filter. Formula (5-1) gives an expression of the Gaussian window as follows:

$$g(r,\theta)=e^{-[(r-r_0)^2/\alpha^2+(\theta-\theta_0)^2/\beta^2]} \qquad (5\text{-}1),$$

if: $(r-r_0)^2/\alpha^2+(\theta-\theta_0)^2/\beta_2=m^2,$ $$g(r,\theta)=e^{-[(r-r_0)^2/\alpha^2+(\theta-\theta_0)^2/\beta^2]}=e^{-m^2} \qquad (5\text{-}2),$$

and therefore, the Gaussian window is an exponential window, and a value of a window function is rapidly decreased along with increase of m.

In equation $(r-r_0)^2/\alpha^2+(\theta-\theta_0)^2/\beta_2\leq m^2$ represents an elliptical region on an $(r,\theta)$ plane with $m\alpha$ and $m\beta$ as long and short axes, and when $\alpha=\beta$, the region is a round, and the region is an effective acting range of the Gabor filter. It can be seen that the effective acting range of the Gabor filter is directly proportional to $\alpha$ and $\beta$, the effective acting range is large if $\alpha$ and $\beta$ are large, and the effective acting range is small if $\alpha$ and $\beta$ are small.

Parameter $\omega$ represents a frequency of a complex sinusoidal function, and determines a frequency selection characteristic of the Gabor filter, and the filter generates different oscillating frequencies according to different $\omega$, thereby giving different responses for different frequency signals.

Gabor filtering of the image is substantially convolution of the Gabor filter and the image, and a Gabor filtering result may reflect information about greyscale distribution of the image in different scales and different directions. Generally speaking, large-scale filtering may reflect information with higher globality, and may also cover influence of noise in the image; and small-scale filtering may reflect a local structure which is relatively fine, but is easily influenced by noise.

A Gabor wavelet is sensitive to an edge of an image, may provide high direction selection and scale selection properties, and are insensitive to light changes and tolerant to image rotation and deformation of a certain degree, so that the Gabor wavelets may be applied to eye location.

According to roundness of irises, in the embodiment of the invention, it is set that parameters $\alpha=\beta$ of the Gabor filter, and a round Gabor wavelet is obtained. In order to endow adaptability to the Gabor wavelet, in the embodiment of the invention, $\alpha$ and $\beta$ are determined according to the size of each eye image, and then the coordinate positions of the eyes may be easily obtained after the adaptive Gabor wavelet filters the first region image I.

In view of existence of light spots around pupils in many images where eyes are opened, before the round Gabor wavelet filters the image I, the eye location method of the embodiment of the invention further includes that: closed operation is performed on the first region image I to reduce influence of light spots on eye location at first. Closed operation refers to morphological operation commonly used for digital image processing, and it may smooth a contour of an object, also eliminate narrow breaks and slender gaps, eliminate small holes and fill fractures in the contour.

The image filtered by the round Gabor wavelet is recorded as I_Gabor, a position with a greyscale minimum in the image I_Gabor is found, and this position may be a coordinate position [eye_x,eye_y] of the eyes. Since the eye image may usually have much noise and the noise may also give responses after filtration of the round Gabor wavelet, that is, a local dark region may appear, serious interference to accurate eye location may be generated. However, it is worth noting that the interference generated by the noise is usually located in corners of the eye image, and in order to avoid the interference of the noise and improve eye location accuracy and considering that eyeballs are usually located in middle of the eye image, in the eye location method of the embodiment of the invention, the minimum is looked for in an intermediate region I_Gabor local of the image I_Gabor, and the position with the minimum is determined as the coordinate position [eye_x,eye_y] of the eyes.

4: Under the condition that the eyes are determined to be in the closed state, the eyes are located by a K-means clustering algorithm, a specific location method is the same as a method for locating the eyes by the K-means clustering algorithm in the conventional art, and will not be elaborated herein, and a difference is that clustering centres in the K-means clustering algorithm are determined in a manner as follows:

5.1: eye greyscale values in the first region and the number of pixels of each eye greyscale value are acquired, that is, each greyscale value representative of the image where the eyes are closed in the first region and the number of the pixels of each greyscale value are acquired;

5.2: a greyscale value sum is calculated according to formula $A=a_{min}n_{min}+a_{min+1}n_{min+1}+a_{min+2}n_{min+2}+ \ldots a_{max}n_{max}$, wherein $a_{min}$ is a greyscale minimum in the eye greyscale values, $n_{min}$ is the number of the pixels of the greyscale minimum, $a_{max}$ is a greyscale maximum in the eye greyscale values, $n_{max}$ is the number of the pixels of the greyscale maximum, $a_{min+n}$ is a greyscale value which is n more than the greyscale minimum, $n_{min+n}$ is the number of the pixels of the greyscale value $a_{min+n}$, and $n \in [1, 2, 3, \ldots, 254]$; and 5.3: the greyscale values which are $$\frac{1A}{4}, \frac{1A}{2} \text{ and } \frac{3A}{4}$$

respectively are determined as three clustering centres in the K-means clustering algorithm.

A core of the K-means clustering algorithm is determination of K clusters, excessively many or excessively few clusters are generated if the number of the clusters is not determined in advance, but the K-means clustering algorithm for locating the eyes randomly selects the clustering centres of the K-means clustering algorithm rather than determining the clustering centres according to a practical condition of the first region image in the conventional art, so that the clustering centres are particularly sensitive to an initial value, and different clustering results may be obtained for different initial values. In the embodiment of the invention, the three clustering centres are obtained according to a greyscale value characteristic of the region where the eyes are closed, so that a greyscale distribution characteristic of the part where the eyes are closed is met, and accuracy of eye location implemented by the K-means clustering algorithm is further ensured.

A specific manner for determining the facial symmetry axis according to the position of the nose in the embodiment of the disclosure will be specifically described below:

first, binaryzation processing is performed on the face image, and specifically, a Sobel operator may be selected to filter the face image at first, and then binaryzation processing may be performed on the filtered face image to obtain edge information with most facial features;

then, all preset slope values are traversed, and all straight lines which pass through the determined position of the nose and of which slopes are the slope values in the preset slope values are determined to be selectable facial symmetry axes; and finally, a certain facial symmetry axis in these selectable facial symmetry axes is determined as a target facial symmetry axis which is actually to be determined, and the target facial symmetry axis needs to meet that: most symmetry points are symmetric about the target facial symmetry axis in the face image, that is, the target facial symmetry axis may be determined by comparing the numbers of symmetry points about the selectable facial symmetry axes in the face image.

A specific manner for regulating the positions of the eyes to obtain target specific positions of the eyes by the facial symmetry axis in the embodiment of the invention will be specifically described below.

Figure 5:
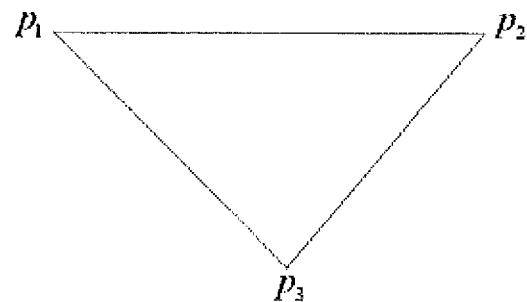
FIG. 5 is a diagram of a target triangle established by an eye location method according to an embodiment of the invention.

8.1: A target triangle is established by taking a left eye position $p_1$ in the positions of the eyes, a right position $p_2$ in the positions of the eyes and the position $p_3$ of the nose as vertexes, the target triangle being shown in FIG. 5.

Side lengths, a proportional relationship among the side lengths and cosine values of interior angles in a triangle structure are invariable in case of rotation and translation, and in addition, proportions among the side lengths and the cosine values of the interior angles are kept invariable in case of a scale change, so that the target triangle may be kept invariable in case of a scale change, rotation and translation to a certain extent, and a basic relationship among the three feature points, i.e. the left eye position $p_1$, the right position $p_2$ and the position $p_3$ of the nose, may be ensured.

8.2: Side lengths $D_{ij}$ of the target triangle are calculated according to formula $D_{ij}=\|p_i-p_j\|^{1/2}$, wherein $D_{12}$ represents the side length between the left eye position $p_1$ and the right eye position $p_2$, $D_{13}$ represents the side length between the left eye position $p_1$ and the position $p_3$ of the nose, and $D_{23}$ represents the side length between the right eye position $p_2$ and the position $p_3$ of the nose.

8.3: Proportions $r_{ij}$ among the side lengths of the target triangle are calculated according to formula $$r_{ij} = \frac{D_{ik}}{D_{jk}},$$

that is, the proportions between every two side lengths in the three side lengths are calculated.

8.4: A cosine value $\cos(\alpha_{ij})$ of each interior angle of the target triangle is calculated according to formula $$\cos(\alpha_{ij}) = \frac{D_{ij}^2 + D_{ik}^2 + D_{jk}^2}{2D_{ij}D_{ik}}.$$

Sides, proportions among the sides and the cosine values of the interior angles of the triangle are adopted to represent relative position distribution between every two feature points and a relative position restriction relationship among the three feature points in the abovementioned steps respectively. Since face sizes are different, relative distances between the feature points (i.e. the proportions between every two side lengths) may be calculated to achieve scale robustness. The cosine values $\cos(\alpha_{ij})$ of each interior angle $\alpha_{ij}$ may be calculated to achieve robustness of rotation in a plane of the face image.

8.5: Whether $P_{final} < T$ is true or not is judged, wherein $$P_{final} = \sum_{i \neq j \in \{1,2,3\}} \frac{N(D_{ij}, \mu_{ij}, \sigma_{ij})}{\sigma_{ij}} + \sum_{i \neq j \neq k \in \{1,2,3\}} \frac{N\left(\frac{D_{ij}}{D_{ik}}, \mu_{ijk}, \sigma_{ijk}\right)}{\sigma_{ijk}} + \sum_{i \neq j \neq k \in \{1,2,3\}} \frac{N\left(\frac{D_{ij}^2 + D_{ik}^2 - D_{jk}^2}{2D_{ij}D_{ik}}, \mu'_{ijk}, \sigma'_{ijk}\right)}{\sigma'_{ijk}}, \frac{N(D_{ij}, \mu_{ij}, \sigma_{ij})}{\sigma_{ij}}$$

is Gaussian distribution of $$D_{ij} = \|p_i - p_j\|^{\frac{1}{2}}, \frac{N\left(\frac{D_{ij}}{D_{ik}}, \mu_{ijk}, \sigma_{ijk}\right)}{\sigma_{ijk}}$$

is Gaussian distribution of $$r_{ij} = \frac{D_{ik}}{D_{jk}}, \frac{N\left(\frac{D_{ij}^2 + D_{ik}^2 - D_{jk}^2}{2D_{ij}D_{ik}}, \mu'_{ijk}, \sigma'_{ijk}\right)}{\sigma'_{ijk}}$$

is Gaussian distribution of $$\cos(\alpha_{ij}) = \frac{D_{ij}^2 + D_{ik}^2 - D_{jk}^2}{2D_{ij}D_{ik}},$$

T is a preset value, and in the embodiment of the invention, T may be 90, and may also be set into another specific numerical value according to a practical requirement.

Considering that different faces are different in size and shape, changes of structure restriction variables are also different. Therefore, the location method of the embodiment of the invention further includes that structure information of the abovementioned three aspects is weighted. Variances of the structure restriction variables reflect stability of the corresponding structure information to a certain extent, so that reciprocal values of the variances are adopted as weights of the corresponding structure restriction variables. In addition, in order to eliminate scale differences of each structure restriction variable, each structure restriction variable is normalized, and $P_{final}$ is determined under the condition that the three types of structure restriction variables are consistent with Gaussian distribution, so that a model for judging location accuracy may be established. Wherein, in the formula of $P_{final}$, averages and variances of Gaussian distribution may be obtained from the training samples by a maximum likelihood estimation method.

8.6: Under the condition that $P_{final} < T$ is determined to be true, the left eye position is determined as a symmetry point of the right eye position about the facial symmetry axis, or the right eye position is determined as a symmetry point of the left eye position about the facial symmetry axis.

8.7: A target triangle is re-established until $P_{final} \geq T$ is determined, that is, Step 8.1 to Step 8.5 are re-executed until $P_{final} \geq T$ is determined after the left eye position or the right eye position is regulated on the basis of the facial symmetry axis, and the left eye position and right eye position, which may make $P_{final} \geq T$ true, are determined as finally determined positions of the eyes.

According to the eye location method provided by the embodiment of the invention, the eyes are rapidly located by AdaBoost according to the features of the eyes in the face image; then different location methods are adopted for different eye states, adaptive Gabor location is adopted for the image where the eyes are opened, and for the image where the eyes are closed, an improved K-means method is adopted to divide the eye region, and then location is performed; and finally the nose and the facial symmetry axis are located, eye location accuracy is judged by a relationship between the nose and the eyes, and the facial symmetry axis is adopted for regulation, so that eye location accuracy is greatly improved. An experiment made with 5,500 face images in a face database proves that the location accuracy is 96.51%. A matlab programming experiment proves that location time for each image is about 0.2 s.

Figure 6:
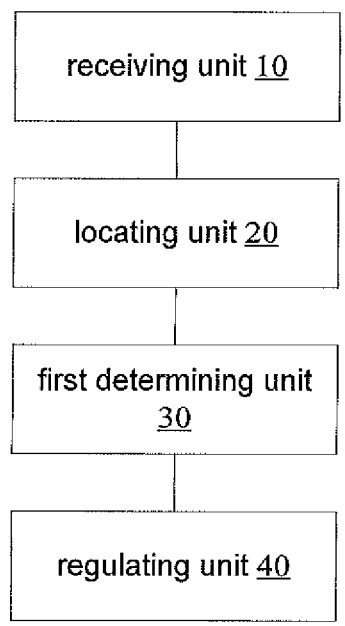
FIG. 6 is a diagram of an eye location device according to an embodiment of the invention.

The embodiment of the invention also provides an eye location device. The device is mainly configured to execute the eye location method provided by the abovementioned contents of the embodiment of the invention. FIG. 6 is a diagram of an eye location device according to an embodiment of the invention, and as shown in FIG. 6, the eye location device mainly includes a receiving unit 10, a locating unit 20, a first determining unit 30 and a regulating unit 40, wherein:

the receiving unit 10 is configured to receive a face image, wherein the face image may be a plane image transmitted in any manner;

the locating unit 20 is configured to locate a position of a nose and positions of eyes in the face image;

the first determining unit 30 is configured to determine a facial symmetry axis according to the position of the nose, wherein each organ is symmetrically distributed on the face, so that the facial symmetry axis undoubtedly passes through the nose, and the eye location device provided by the embodiment of the disclosure determines the facial symmetry axis according to the position of the nose; and the regulating unit 40 is configured to regulate positions of the eyes to obtain target positions of the eyes by the facial symmetry axis.

According to the eye location device of the embodiment of the disclosure, the eyes are located by locating the nose, determining the facial symmetry axis and regulating the positions of the eyes by the facial symmetry axis, so that the problem of poorer eye location accuracy in the conventional art is solved, and the effect of improving eye location accuracy is further achieved.

In the embodiment of the disclosure, the locating unit 20 performs convolution calculation by a preset nose template image and the face image and performs screening by an SVM to locate the nose in the face image. Specific description will be given below.

Preferably, the nose may have two different states in the face image when a person raises the head and lowers the head, so that a specific manner for the locating unit 20 to locate the nose is specifically described schematically with the condition that the preset nose template image includes a first template image and a second template image as an example in the embodiment of the disclosure, wherein nostril angles in the first template image are different from nostril angles in the second template image, that is, one of angles of nostril lines in the two template images relative to a horizontal plane is large, and the other is small. The locating unit 20 mainly includes a first calculating subunit, a second calculating subunit, a first marking subunit, a combinating subunit and a first determining subunit, wherein:

the first calculating subunit is configured to perform convolution calculation by the face image and the first template image to obtain a first convolution image, perform convolution calculation by the face image and the second template image to obtain a second convolution image, i.e. F_nose=F_img*nose, wherein the first convolution image is an image obtained by convolution calculation of the first template image and the face image, the second convolution image is an image obtained by convolution calculation of the second template image and the face image, F_img is the face image, nose is a nose template, and F_nose is a convolution image obtained by convolution with the nose template;

the second calculating subunit is configured to calculate regional maximums of the first convolution image and the second convolution image respectively;

the first marking subunit is configured to obtain a binary image of the first convolution image and a binary image of the second convolution image, called a first binary image and a second binary image respectively, by marking positions with the regional maximum on the first convolution image and positions with the regional maximum on the second convolution image into 1 and marking other points (i.e. positions without the regional maximum) on the first convolution image and other points (i.e. positions without the regional maximum) on the second convolution image into 0, wherein it is supposed that an acute angle in included angles between the nostril lines and vertical line in the first template image is larger than an acute angle in included angles between the nostril lines and vertical line in the second template image, that is, the first template image represents the state of the nose when the person raises the head and the second template image represents the state of the nose when the person lowers the head, the obtained binary image of the first convolution image is shown in FIG. 3A, and the obtained binary image of the second convolution image is shown in FIG. 3B;

the combinating subunit is configured to combine the first binary image and the second binary image to obtain a third binary image, as shown in FIG. 3C, wherein white points in FIG. 3A, FIG. 3B and FIG. 3C represent the positions with the regional maximums, and combination refers to extraction of a union of the two binary images; and the first determining subunit is configured to determine a regional gravity centre of positions with a regional maximum in the third binary image as the position of the nose.

In the conventional art, when the nose is located, a template matching method is usually adopted, and a maximum point of a template matching coefficient is directly calculated as the position of the nose. While in the embodiment of the disclosure, the convolution images of the face image and the template images are calculated to obtain a matching coefficient at first, then the positions with the regional maximums in the convolution images are calculated, the positions with the regional maximums are candidate points of the position of the nose, and the regional gravity centre of the positions with the regional maximum is further determined as the position of the nose. Compared with location of the nose in the conventional art, location of the nose in the embodiment of the disclosure has the advantages that the candidate points of the position of the nose may be accurately screened and nose location accuracy may be improved.

Preferably, the first determining subunit of the embodiment of the disclosure further includes a processing unit, a searching unit and a second determining unit, the processing unit, the searching unit and the second determining unit co-acting to determine the regional gravity centre of the positions with the regional maximum in the third binary image, wherein:

the processing unit is configured to perform morphological expansion processing on the third binary image to obtain multiple connected regions by a preset matrix $$\begin{bmatrix} 0 & 0 & 1 & 0 & 0 \\ 0 & 1 & 1 & 1 & 0 \\ 1 & 1 & 1 & 1 & 1 \\ 0 & 1 & 1 & 1 & 0 \\ 0 & 0 & 1 & 0 & 0 \end{bmatrix};$$

the searching unit is configured to search the multiple connected regions for the largest connected region; and the second determining unit is configured to determine a gravity centre of the largest connected region as the regional gravity centre.

Preferably, the locating unit 20 in the eye location device of the embodiment of the disclosure further includes a first judging subunit, a keeping subunit and a marking subunit, and after the first binary image and the second binary image are combined to obtain the third binary image and before the regional gravity centre of the positions with the regional maximum in the third binary image is determined as the position of the nose, the first judging subunit is configured to judge target points by the SVM, wherein the target points are points which are 1 in the third binary image; the keeping subunit is configured to, under the condition that the target points are determined to be still 1 by the SVM, keep the target points to be marked into 1 in the third binary image; and the second marking subunit is configured to, under the condition that the target points are determined to be 0 by the SVM, remark the target points into 0 in the third binary image, wherein the first determining subunit is configured to determine the regional gravity centre of the positions with the regional maximum in the third binary image which is remarked as the position of the nose.

Preferably, training of the SVM is to obtain a parameter of an optimal classification plane by training according to a sample of a known type. For a problem of binary classification, the SVM outputs a label of +1 or −1 during judgment, +1 represents a positive sample during training, and −1 represents a negative sample during training. In the embodiment of the invention, a specific method for the judgment unit to judge the target points by the SVM is implemented as follows:

first, greyscale features of samples are loaded into a training function of the SVM, and training is performed to obtain classifiers, wherein a specific method for obtaining the classifiers is the same as a manner of loading the greyscale features into the training function to obtain the classifiers in the conventional art, and will not be elaborated herein, wherein the samples include positive samples and negative samples, the positive samples are nose regions captured from a standard face image in advance, and the negative samples are non-nose region captured from the standard face image in advance; and then, images are captured from the face image according to proportions by taking the points with a value of 1 in the third binary image as centres, greyscale features of the images are loaded into the classifiers obtained by the SVM in the abovementioned step for judgment, the corresponding points in the third binary image are marked into 1 if judgment results are 1, and the corresponding points in the third binary image are marked into 0 if the judgment results are 0, wherein the proportions are the same as proportions of the samples in the standard face image in the abovementioned step.

After the SVM is utilized for judgment, part of the candidate points are further excluded, and most of the other candidate points are gathered in the vicinity of the nose, so that nose location accuracy is further improved.

Preferably, the eye location device of the embodiment of the disclosure further includes a normalizating unit, and before the nose is located, the normalizating unit normalizes the face image into a first preset size (for example, height×width=90 pixels×75 pixels) and then performs nose location on the basis of the face image which is normalized into the preset size.

Since the nose is distributed on the face according to a certain proportion, the face is normalized into a certain size before the nose is located. In such a manner, influence of the size is not required to be considered in subsequent processing, and the location speed is increased.

The locating unit 20 further includes a detecting subunit, a transformation subunit, a first locating subunit and a second locating subunit, wherein:

the detecting subunit is configured to detect a first region where the eyes are located in the face image by an AdaBoost algorithm, wherein a specific detection manner for the detecting subunit to detect the first region is the same as an algorithm for detecting a region where the eyes are located by the AdaBoost algorithm in the conventional art, wherein a specific training process of the AdaBoost algorithm is as follows:

(a) all the training samples (including the positive samples and the negative samples) are normalized into the same size, and feature values, corresponding to all eye feature templates, of the face image are calculated, thereby obtaining a feature set, wherein the positive samples refer to eye samples, and the negative samples refer to non-eye samples or samples including part of the eyes;

(b) an optimal threshold value is determined according to the calculated feature set and a weak classifier training algorithm, and a weak classifier set is obtained;

(c) under the condition that a given detection rate and false detection rate are met, optimal weak classifiers are selected from the weak classifier set to form strong classifiers;

(d) the obtained strong classifiers are combined into a cascaded classifier; and (e) the samples which are falsely determined into the eyes in a non-eye sample set are screened by the obtained cascaded classifier, and then the non-eye samples are supplemented for subsequent training.

By the abovementioned process, the classifiers detecting eye regions on the face image may be obtained, thereby laying a foundation for subsequent work to accurately detect the first region where the eyes are located in the face image.

Preferably, in the embodiment of the disclosure, training in Step (a) to Step (e) may be repeated until the preset detection rate and false detection rate are met, and the classifiers detecting the eye regions in the face image are obtained.

Preferably, in a process of detecting the first region, the left eye may be detected only on the face at a left upper part of the face image, and the right eye may be detected only on the face at a right upper part of the face image.

Since the positions of the eyes on the face are relatively fixed, during detection, the left eye may be detected only on the face at the left upper part, and similarly, the right eye may be detected on the face at the right upper part; and in such a manner, interference of the nose and a mouth may be eliminated, and the detection speed may also be increased.

Preferably, before the first region is detected, the eye location device of the embodiment of the disclosure further includes a method of normalizing the face image into a second preset size (for example, height×width=65 pixels×65 pixels) and then detecting the first region on the basis of the face image which is normalized into the second preset size.

Since a size of the face is obtained by face detection and sizes of the eye regions have certain proportional relationships with the size of the face, the face image is normalized into the second preset size, the eye regions are all in the same scale (about height×width=10 pixels×20 pixels), and then the features of the face are only required to be calculated once under such a size.

The transformation subunit is configured to perform radial symmetric transformation on the first region to determine opened or closed states of the eyes, wherein radial symmetric transformation is a simple and rapid gradient-based target detection operator developed on the basis of general symmetric transformation. Transformation mainly highlights a round and symmetric region by a feature of radial symmetry, thereby implementing detection of a round target and further determining the opened or closed states of the eyes by a radial symmetric transformation method. A specific algorithm for radial symmetric transformation is the same as the abovementioned content, and will not be elaborated herein.

Preferably, the eye location device of the embodiment of the disclosure further includes a unit which judges whether an average greyscale value of the first region is smaller than a preset value or not, and a unit which, under the condition that the average greyscale value of the first region is determined to be smaller than the preset value, performs logarithmic transformation on a greyscale value of an eye image represented by the first region, wherein, before radial symmetric transformation is performed on the first region to determine the opened or closed states of the eyes, whether the average greyscale value of the first region is smaller than the preset value or not is judged, and then, under the condition that the average greyscale value of the first region is determined to be smaller than the first preset, logarithmic transformation is performed on the greyscale value of the eye image represented by the first region, and logarithmic transformation may specifically be performed by adopting formula I=c*log(1+I_eye), where I_eye represents an original greyscale value of the eye image, I represents a greyscale value of the eye image after logarithmic transformation, c is a constant, c=1 in the embodiment of the disclosure, and in the embodiment of the disclosure, the preset value may be 115, and may also be a numerical value about 115 according to a practical requirement.

Logarithmic transformation is performed on the eye image with a smaller greyscale value to narrow a dynamic range, and such regulation over the greyscale range of the image may alleviate the phenomenon of non-uniform light on the image, enhance image details of a dark region and further ensure subsequent eye location accuracy.

The first locating subunit is configured to, under the condition that the eyes are determined to be in the opened state, locate the eyes by a Gabor filter, namely accurately locate the opened eyes on the basis of an adapted round Gabor, wherein a polar coordinate of the Gabor filter is:

$$G(r,\theta)=e^{-i\omega(\theta-\theta_0)}e^{-(r-r_0)^2/\alpha^2}e^{-(\theta-\theta_0)^2/\beta^2}.$$

From the above formula, a real part of the Gabor filter is evenly symmetric, the Gabor filter is a product of a two-dimensional Gaussian function and a complex exponent, $r_0$ and $\theta_0$, are parameter factors determining a centre of the Gabor filter, $\alpha$ and $\beta$ are scale factors of the Gaussian window in the Gabor filter, and a series of parameters may be regulated to obtain filters of different scales, frequencies and directions. In the embodiment of the disclosure, $\alpha$ and $\beta$ are determined according to the size of the face image, and $\omega$ is an oscillating frequency of the Gabor filter. Formula (5-1) gives an expression of the Gaussian window as follows:

$$g(r,\theta)=e^{-[(r-r_0)^2/\alpha^2+(\theta-\theta_0)^2/\beta^2]} \quad (5\text{-}1),$$

if: $(r-r_0)^2/\alpha^2+(\theta-\theta_0)^2/\beta_2=m^2$, $$g(r,\theta)=e^{-[(r-r_0)^2/\alpha^2+(\theta-\theta_0)^2/\beta^2]}=e^{-m^2} \quad (5\text{-}2),$$

and therefore, the Gaussian window is an exponential window, and a value of a window function is rapidly decreased along with increase of m.

Inequation $(r-r_0)^2/\alpha^2+(\theta-\theta_0)^2/\beta_2 \leq m^2$ represents an elliptical region on an $(r,\theta)$ plane with $m\alpha$ and $m\beta$ as long and short axes, and when $\alpha=\beta$, the region is a round, and the region is an effective acting range of the Gabor filter. It can be seen that the effective acting range of the Gabor filter is directly proportional to $\alpha$ and $\beta$, the effective acting range is large if $\alpha$ and $\beta$ are large, and the effective acting range is small if $\alpha$ and $\beta$ are small.

Parameter $\omega$ represents a frequency of a complex sinusoidal function, and determines a frequency selection characteristic of the Gabor filter, and the filter generates different oscillating frequencies according to different $\omega$, thereby giving different responses for different frequency signals.

Gabor filtering of the image is substantially convolution of the Gabor filter and the image, and a Gabor filtering result may reflect information about greyscale distribution of the image in different scales and different directions. Generally speaking, large-scale filtering may reflect information with higher globality, and may also cover influence of noise in the image; and small-scale filtering may reflect a local structure which is relatively fine, but is easily influenced by noise.

A Gabor wavelet is sensitive to an edge of an image, may provide high direction selection and scale selection properties, and are insensitive to light changes and tolerant to image rotation and deformation of a certain degree, so that the Gabor wavelets may be applied to eye location.

According to roundness of irises, in the embodiment of the disclosure, it is set that parameters $\alpha=\beta$ of the Gabor filter, and a round Gabor wavelet is obtained. In order to endow adaptability to the Gabor wavelet, in the embodiment of the disclosure, $\alpha$ and $\beta$ are determined according to the size of each eye image, and then the coordinate positions of the eyes may be easily obtained after the adaptive Gabor wavelet filters the first region image I.

In view of existence of light spots around pupils in many images where eyes are opened, before the round Gabor wavelet filters the image I, the eye location device of the embodiment of the disclosure further: performs closed operation on the first region image I to reduce influence of light spots on eye location at first. Closed operation refers to morphological operation commonly used for digital image processing, and it may smooth a contour of an object, also eliminate narrow breaks and slender gaps, eliminate small holes and fill fractures in the contour.

The image filtered by the round Gabor wavelet is recorded as I_Gabor, a position with a greyscale minimum in the image I_Gabor is found, and this position may be a coordinate position [eye_x,eye_y] of the eyes. Since the eye image may usually have much noise and the noise may also give responses after filtration of the round Gabor wavelet, that is, a local dark region may appear, serious interference to accurate eye location may be generated. However, it is worth noting that the interference generated by the noise is usually located in corners of the eye image, and in order to avoid the interference of the noise and improve eye location accuracy and considering that eyeballs are usually located in middle of the eye image, the eye location device of the embodiment of the disclosure looks for the minimum in an intermediate region I_Gabor local of the image I_Gabor, and determines the position with the minimum as the coordinate position [eye_x,eye_y] of the eyes.

The second locating subunit is configured to, under the condition that the eyes are determined to be in the closed state, locate the eyes by a K-means clustering algorithm, wherein a specific location method is the same as a method for locating the eyes by the K-means clustering algorithm in the conventional art, and will not be elaborated herein, and a difference is that the second locating subunit of the embodiment of the disclosure further includes an acquisition unit, a calculating unit and a third determining unit, and determines clustering centres in the K-means clustering algorithm in a manner as follows:

first, the acquiring unit acquires eye greyscale values in the first region and the number of pixels of each eye greyscale value, namely acquires each greyscale value representative of the image where the eyes are closed in the first region and the number of the pixels of each greyscale value;

then, the calculating unit calculates a greyscale value sum according to formula $A=a_{min}n_{min}+a_{min+1}n_{min+1}+a_{min+2}n_{min+2}+\ldots a_{max}n_{max}$, wherein $a_{min}$ is a greyscale minimum in the eye greyscale values, $n_{min}$ is the number of the pixels of the greyscale minimum, $a_{max}$ is a greyscale maximum in the eye greyscale values, $n_{max}$ is the number of the pixels of the greyscale maximum, $a_{min+n}$ is a greyscale value which is n more than the greyscale minimum, $n_{min+n}$ is the number of the pixels of the greyscale value $a_{min+n}$, and n∈[1, 2, 3, . . . , 254]; and finally, the third determining unit determines the greyscale values which are $$\frac{1A}{4}, \frac{1A}{2} \text{ and } \frac{3A}{4}$$

respectively as three clustering centres in the K-means clustering algorithm.

A core of the K-means clustering algorithm is determination of K clusters, excessively many or excessively few clusters are generated if the number of the clusters is not determined in advance, but the K-means clustering algorithm for locating the eyes randomly selects the clustering centres of the K-means clustering algorithm rather than determining the clustering centres according to a practical condition of the first region image in the conventional art, so that the clustering centres are particularly sensitive to an initial value, and different clustering results may be obtained for different initial values. In the embodiment of the disclosure, the three clustering centres are obtained according to a greyscale value characteristic of the region where the eyes are closed, so that a greyscale distribution characteristic of the part where the eyes are closed is met, and accuracy of eye location implemented by the K-means clustering algorithm is further ensured.

A specific manner for the first determining unit 30 to determine the facial symmetry axis according to the position of the nose in the embodiment of the disclosure will be specifically described below:

first, binarization processing is performed on the face image, and specifically, a Sobel operator may be selected to filter the face image at first, and then binarization processing may be performed on the filtered face image to obtain edge information with most facial features;

then, all preset slope values are traversed, and all straight lines which pass through the determined position of the nose and of which slopes are the slope values in the preset slope values are determined to be selectable facial symmetry axes; and finally, a certain facial symmetry axis in these selectable facial symmetry axes is determined as a target facial symmetry axis which is actually to be determined, and the target facial symmetry axis needs to meet that: most symmetry points are symmetric about the target facial symmetry axis in the face image, that is, the target facial symmetry axis may be determined by comparing the numbers of symmetry points about the selectable facial symmetry axes in the face image.

The regulating unit 40 includes an establishing subunit, a third calculating subunit, a fourth calculating subunit, a fifth calculating subunit, a second judging subunit and a second determining subunit, wherein:

the establishing subunit is configured to establish a target triangle by taking a left eye position $p_1$ in the positions of the eyes, a right position $p_2$ in the positions of the eyes and the position $p_3$ of the nose as vertexes.

Side lengths, a proportional relationship among the side lengths and cosine values of interior angles in a triangle structure are invariable in case of rotation and translation, and in addition, proportions among the side lengths and the cosine values of the interior angles are kept invariable in case of a scale change, so that the target triangle may be kept invariable in case of scale change, rotation and translation to a certain extent, and a basic relationship among the three feature points, i.e. the left eye position $p_1$, the right position $p_2$ and the position $p_3$ of the nose, may be ensured.

The third calculating subunit is configured to calculate side lengths $D_{ij}$ of the target triangle according to formula $D_{ij}=\|p_i-p_j\|^{1/2}$, wherein $D_{12}$ represents the side length between the left eye position $p_1$ and the right eye position $p_2$, $D_{13}$ represents the side length between the left eye position $p_1$ and the position $p_3$ of the nose, and $D_{23}$ represents the side length between the right eye position $p_2$ and the position $p_3$ of the nose.

The fourth calculating subunit is configured to calculate proportions $r_{ij}$ among the side lengths of the target triangle according to formula $$r_{ij} = \frac{D_{ik}}{D_{jk}},$$

namely calculate the proportions between every two side lengths in the three side lengths.

The fifth calculating subunit is configured to calculate a cosine value $\cos(\alpha_{ij})$ of each interior angle of the target triangle according to formula $$\cos(\alpha_{ij}) = \frac{D_{ij}^2 + D_{ik}^2 - D_{jk}^2}{2D_{ij}D_{ik}}.$$

The third calculating subunit, the fourth calculating subunit and the fifth calculating subunit adopt sides, proportions among the sides and the cosine values of the interior angles of the triangle to represent relative position distribution between every two feature points and a relative position restriction relationship among the three feature points respectively. Since face sizes are different, relative distances between the feature points (i.e. the proportions between every two side lengths) may be calculated to achieve scale robustness. The cosine values $\cos(\alpha_{ij})$ of each interior angle $\alpha_{ij}$ may be calculated to achieve robustness of rotation in a plane of the face image.

The second judging subunit is configured to judge whether $P_{final}<T$ is true or not, wherein $$P_{final} = \sum_{i \neq j \in \{1,2,3\}} \frac{N(D_{ij}, \mu_{ij}, \sigma_{ij})}{\sigma_{ij}} + \sum_{i \neq j \neq k \in \{1,2,3\}} \frac{N\left(\frac{D_{ij}}{D_{ik}}, \mu_{ijk}, \sigma_{ijk}\right)}{\sigma_{ijk}} +$$

$$\sum_{i \neq j \neq k \in \{1,2,3\}} \frac{N\left(\frac{D_{ij}^2 + D_{ik}^2 - D_{jk}^2}{2D_{ij}D_{ik}}, \mu'_{ijk}, \sigma'_{ijk}\right)}{\sigma'_{ijk}}, \frac{N(D_{ij}, \mu_{ij}, \sigma_{ij})}{\sigma_{ij}}$$

is Gaussian distribution of $$D_{ij} = \|p_i - p_j\|^{\frac{1}{2}}, \frac{N\left(\frac{D_{ij}}{D_{ik}}, \mu_{ijk}, \sigma_{ijk}\right)}{\sigma_{ijk}}$$

is Gaussian distribution of $$r_{ij} = \frac{D_{ik}}{D_{jk}}, \frac{N\left(\frac{D_{ij}^2 + D_{ik}^2 - D_{jk}^2}{2D_{ij}D_{ik}}, \mu'_{ijk}, \sigma'_{ijk}\right)}{\sigma'_{ijk}}$$

is Gaussian distribution of $$\cos(\alpha_{ij}) = \frac{D_{ij}^2 + D_{ik}^2 + D_{jk}^2}{2D_{ij}D_{ik}},$$

T is a preset value, and in the embodiment of the disclosure, T may be 90, and may also be set into another specific numerical value according to a practical requirement.

Considering that different faces are different in size and shape, changes of structure restriction variables are also different. Therefore, the location device of the embodiment of the disclosure further weights structure information of the abovementioned three aspects. Variances of the structure restriction variables reflect stability of the corresponding structure information to a certain extent, so that reciprocal values of the variances are adopted as weights of the corresponding structure restriction variables. In addition, in order to eliminate scale differences of each structure restriction variable, each structure restriction variable is normalized, and $P_{final}$ is determined under the condition that the three types of structure restriction variables are consistent with Gaussian distribution, so that a model for judging location accuracy may be established. Wherein, in the formula of $P_{final}$, averages and variances of Gaussian distribution may be obtained from the training samples by a maximum likelihood estimation method.

The second determining subunit is configured to, under the condition that $P_{final}<T$ is determined to be true, determine the left eye position as a symmetry point of the right eye position about the facial symmetry axis, or determine the right eye position as a symmetry point of the left eye position about the facial symmetry axis.

Wherein, the establishing subunit is further configured to re-establish a target triangle until the second judging subunit judges that $P_{final} \geq T$, that is, the establishing subunit, the third calculating subunit, the fourth calculating subunit, the fifth calculating subunit and the second judging subunit re-execute own corresponding functional steps until $P_{final} \geq T$ is determined after the left eye position or the right eye position is regulated on the basis of the facial symmetry axis, and the left eye position and right eye position, which may make $P_{final} \geq T$ true, are determined as finally determined positions of the eyes.

According to the eye location device provided by the embodiment of the disclosure, the eyes are rapidly located by AdaBoost according to the features of the eyes in the face image; then different location methods are adopted for different eye states, adaptive Gabor location is adopted for the image where the eyes are opened, and for the image where the eyes are closed, an improved K-means method is adopted to divide the eye region, and then location is performed; and finally the nose and the facial symmetry axis are located, eye location accuracy is judged by a relationship between the nose and the eyes, and the facial symmetry axis is adopted for regulation, so that eye location accuracy is greatly improved. An experiment made with 5,500 face images in a face database proves that the location accuracy is 96.51%. A matlab programming experiment proves that location time for each image is about 0.2 s.

It is important to note that the steps shown in the flowcharts of the drawings may be executed in a computer system, such as a group of computers, capable of executing instructions, and moreover, although logic sequences are shown in the flowcharts, the shown or described steps may be executed in sequences different from the sequences described here under some circumstances.

Obviously, those skilled in the art should know that each module or step of the embodiment of the disclosure may be implemented by a universal computing device, and the modules or steps may be concentrated on a single computing device or distributed on a network formed by a plurality of computing devices, and may optionally be implemented by programmable codes executable for the computing devices, so that the modules or steps may be stored in a storage device for execution with the computing devices, or the modules or steps form each integrated circuit module respectively, or multiple modules or steps therein may form a single integrated circuit module for implementation. As a consequence, the disclosure is not limited to any specific hardware and software combination.

The above is only the preferred embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

What is claimed is:

1. An eye location method, comprising:
receiving a face image;
locating a position of a nose and positions of eyes in the face image, wherein convolution calculation is performed by virtue of a preset nose template image and the face image to locate the nose in the face image;
determining a facial symmetry axis according to the position of the nose; and
regulating the positions of the eyes by the facial symmetry axis to obtain target positions of the eyes, wherein the locating the position of the nose and the positions of the eyes in the face image further comprises:
detecting a first region where the eyes are located in the face image by an AdaBoost algorithm;
performing radial symmetric transformation on the first region to determine opened or closed states of the eyes;
under the condition that the eyes are determined to be in the opened state, locating the positions of the eyes by a Gabor filter; and
under the condition that the eyes are determined to be in the closed state, locating the positions of the eyes by a K-means clustering algorithm.

2. The eye location method according to claim 1, wherein the preset nose template image comprises a first template image and a second template image, wherein nostril angles in the first template image are different from nostril angles in the second template image, and performing convolution calculation by a preset nose template image and the face image to locate the nose in the face image comprises:
performing convolution calculation by the face image and the first template image to obtain a first convolution image, performing convolution calculation by the face image and the second template image to obtain a second convolution image;
calculating regional maximums of the first convolution image and the second convolution image respectively;
marking positions with the regional maximum on the first convolution image and positions with the regional maximum on the second convolution image into 1 and marking positions without the regional maximum on the first convolution image and positions without the regional maximum on the second convolution image into 0 to obtain a binary image of the first convolution image and a binary image of the second convolution image;
combining a first binary image and a second binary image to obtain a third binary image, wherein the first binary image is the binary image of the first convolution image and the second binary image is the binary image of the second convolution image; and determining a regional gravity centre of positions with a regional maximum in the third binary image as the position of the nose.

3. The eye location method according to claim 2, wherein determining the regional gravity centre further comprises:
dilating the third binary image by a preset matrix to obtain multiple connected regions;
searching a largest connected region in the multiple connected regions; and
determining a gravity centre of the largest connected region as the regional gravity centre.

4. The eye location method according to claim 2, wherein, after combining a first binary image and a second binary image to obtain a third binary image and before the determining a regional gravity centre of positions with a regional maximum in the third binary image as the position of the nose, comprises performing filtering by a Support Vector Machine (SVM) further comprising:
judging target points by the SVM, wherein the target points are points which are 1 in the third binary image;
under the condition that the target points are judged to be still marked into 1 by the SVM, keeping the target points to be marked into 1 in the third binary image; and
under the condition that the target points are judged to be should be marked into 0 by the SVM, remarking the target points into 0 in the third binary image,
wherein the regional gravity centre of the positions with the regional maximum in the third binary image which is remarked is determined as the position of the nose.

5. The eye location method according to claim 1, wherein a polar coordinate of the Gabor filter is $G(r,\theta) = e^{-i\omega(\theta-\theta_0)} e^{-(r-r_0)^2/\alpha^2} e^{-(\theta-\theta_0)^2/\beta^2}$, where $r_0$ and $\theta_0$ are parameter factors determining a centre of the Gabor filter, $\alpha$ and $\beta$ are scale factors of a Gaussian window in the Gabor filter, $\alpha$ and $\beta$ are determined according to a size of the face image, and $\omega$ is an oscillating frequency of the Gabor filter.

6. The eye location method according to claim 1, wherein determining clustering centres in the K-means clustering algorithm further comprises:
acquiring eye greyscale values in the first region and the number of pixels of each eye greyscale value;
calculating a greyscale value sum according to formula $A = a_{min}n_{min} + a_{min+1}n_{min+1} + a_{min+2}n_{min+2} + \ldots a_{max}n_{max}$, wherein a is a greyscale minimum in the eye greyscale values, $n_{min}$ is the number of the pixels of the greyscale minimum, $a_{max}$ is a greyscale maximum in the eye greyscale values, $n_{max}$ is the number of the pixels of the greyscale maximum, $a_{min+n}$ is a greyscale value which is n more than the greyscale minimum, $n_{min+n}$ is the number of the pixels of the greyscale value $a_{min+n}$, and $n \in [1, 2, 3, \ldots, 254]$; and
determining the greyscale values which are $$\frac{1A}{4}, \frac{1A}{2} \text{ and } \frac{3A}{4}$$

respectively as three clustering centres in the K-means clustering algorithm.

7. The eye location method according to claim 1, wherein regulating the positions of the eyes by the facial symmetry axis to obtain target positions of the eyes comprises that:
establishing a target triangle by taking a left eye position $p_1$ in the positions of the eyes, a right position $p_2$ in the positions of the eyes and the position $p_3$ of the nose as vertexes;

calculating side lengths $D_{ij}$ of the target triangle according to formula $D_{ij} = \|p_i - p_j\|^{1/2}$;
calculating proportions $r_{ij}$ among the side lengths of the target triangle according to formula $$r_{ij} = \frac{D_{ik}}{D_{jk}};$$

establishing for a cosine value $\cos(\alpha_{ij})$ of each interior angle of the target triangle according to formula $$\cos(\alpha_{ij}) = \frac{D_{ij}^2 + D_{ik}^2 + D_{jk}^2}{2D_{ij}D_{ik}};$$

judging whether $P_{final} < T$ is true or not, wherein $$P_{final} = \sum_{i \neq j \in \{1,2,3\}} \frac{N(D_{ij}, \mu_{ij}, \sigma_{ij})}{\sigma_{ij}} + \sum_{i \neq j \neq k \in \{1,2,3\}} \frac{N\left(\frac{D_{ij}}{D_{ik}}, \mu_{ijk}, \sigma_{ijk}\right)}{\sigma_{ijk}} + \sum_{i \neq j \neq k \in \{1,2,3\}} \frac{N\left(\frac{D_{ij}^2 + D_{ik}^2 - D_{jk}^2}{2D_{ij}D_{ik}}, \mu'_{ijk}, \sigma'_{ijk}\right)}{\sigma'_{ijk}}, \frac{N(D_{ij}, \mu_{ij}, \sigma_{ij})}{\sigma_{ij}}$$

is Gaussian distribution of $$D_{ij} - \|p_i - p_j\|^{\frac{1}{2}}, \frac{N\left(\frac{D_{ij}}{D_{ik}}, \mu_{ijk}, \sigma_{ijk}\right)}{\sigma_{ijk}}$$

is Gaussian distribution of $$r_{ij} = \frac{D_{ik}}{D_{jk}}, \frac{N\left(\frac{D_{ij}^2 + D_{ik}^2 - D_{jk}^2}{2D_{ij}D_{ik}}, \mu'_{ijk}, \sigma'_{ijk}\right)}{\sigma'_{ijk}}$$

is Gaussian distribution of $$\cos(\alpha_{ij}) = \frac{D_{ij}^2 + D_{ik}^2 + D_{jk}^2}{2D_{ij}D_{ik}},$$

and T is a preset value;
under the condition that $P_{final} < T$ is determined to be true, determining the left eye position as a symmetry point of the right eye position about the facial symmetry axis, or determining the right eye position as a symmetry point of the left eye position about the facial symmetry axis; and
re-establishing a target triangle until $P_{final} \geq T$ is determined.

8. An eye location device, comprising:
a receiving unit, configured to receive a face image;
a locating unit, configured to locate a position of a nose and positions of eyes in the face image, wherein the locating unit is configured to perform convolution calculation by a preset nose template image and the face image to locate the nose in the face image;
a first determining unit, configured to determine a facial symmetry axis according to the position of the nose; and
a regulating unit, configured to regulate the positions of the eyes by the facial symmetry axis to obtain target positions of the eyes, wherein the locating unit further comprises:
a detecting subunit, configured to detect a first region where the eyes are located in the face image by an AdaBoost algorithm;
a transformating subunit, configured to perform radial symmetric transformation on the first region to determine opened or closed states of the eyes;
a first locating subunit, configured to, under the condition that the eyes are determined to be in the opened state, locate the positions of the eyes by a Gabor filter; and
a second locating subunit, configured to, under the condition that the eyes are determined to be in the closed state, locate the positions of the eyes by a K-means clustering algorithm.

9. The eye location device according to claim 8, wherein the preset nose template image comprises a first template image and a second template image, wherein nostril angles in the first template image are different from nostril angles in the second template image, and the locating unit comprises:
a first calculating subunit, configured to perform convolution calculation by the face image and the first template image to obtain a first convolution image, perform convolution calculation by the face image and the second template image to obtain a second convolution image;
a second calculating subunit, configured to calculate regional maximums of the first convolution image and the second convolution image respectively;
a first marking subunit, configured to mark positions with the regional maximum on the first convolution image and positions with the regional maximum on the second convolution image into 1 and marking positions without the regional maximum on the first convolution image and positions without the regional maximum on the second convolution image into 0 to obtain a binary image of the first convolution image and a binary image of the second convolution image;
a combining subunit, configured to combine a first binary image and a second binary image to obtain a third binary image, wherein the first binary image is the binary image of the first convolution image and the second binary image is the binary image of the second convolution image; and
a first determining subunit, configured to determine a regional gravity centre of positions with a regional maximum in the third binary image as the position of the nose.

10. The eye location device according to claim 9, wherein the first determining subunit further comprises:
a processing unit, configured to dilate the third binary image by a preset matrix to obtain multiple connected regions by a preset matrix;
a searching unit, configured to search a largest connected region in the multiple connected regions; and
a second determining unit, configured to determine a gravity centre of the largest connected region as the regional gravity centre.

11. The eye location device according to claim 9, wherein the locating unit further comprises:
a first judging subunit, configured to judge target points by the SVM, wherein the target points are points which are 1 in the third binary image;
a keeping subunit, configured to, under the condition that the target points are judged to be still marked into 1 by the SVM, keep the target points to be marked into 1 in the third binary image; and
a second marking subunit, configured to, under the condition that the target points are judged to be should be mark into 0 by the SVM, remark the target points into 0 in the third binary image,
wherein the first determining subunit is configured to determine the regional gravity centre of the positions with the regional maximum in the third binary image which is remarked as the position of the nose.

12. The eye location device according to claim 8, wherein a polar coordinate of the Gabor filter is $G(r,\theta)= e^{-i\omega(\theta-\theta_0)}e^{-(r-r_0)^2/\alpha^2}e^{-(\theta-\theta_0)^2/\beta^2}$, where $r_0$ and $\theta_0$ are parameter factors determining a centre of the Gabor filter, $\alpha$ and $\beta$ are scale factors of a Gaussian window in the Gabor filter, $\alpha$ and $\beta$ are determined according to a size of the face image, and $\omega$ is an oscillating frequency of the Gabor filter.

13. The eye location device according to claim 8, wherein the second locating subunit further comprises:
an acquiring unit, configured to acquire eye greyscale values in the first region and the number of pixels of each eye greyscale value;
a calculating unit, configured to calculate a greyscale value sum according to formula $A=a_{min}n_{min}+a_{min+1}n_{min+1}+a_{min+2}n_{min+2}+\ldots a_{max}n_{max}$, wherein $a_{min}$ is a greyscale minimum in the eye greyscale values, $n_{min}$ is the number of the pixels of the greyscale minimum, $a_{max}$ is a greyscale maximum in the eye greyscale values, $n_{max}$ is the number of the pixels of the greyscale maximum, $a_{min+n}$ is a greyscale value which is n more than the greyscale minimum, $n_{min+n}$ is the number of the pixels of the greyscale value $a_{min+n}$, and $n\in[1, 2, 3, \ldots, 254]$; and
a third determining unit, configured to determine the greyscale values which are $$\frac{1A}{4}, \frac{1A}{2} \text{ and } \frac{3A}{4}$$

respectively as three clustering centres in the K-means clustering algorithm.

14. The eye location device according to claim 8, wherein the regulating unit comprises:
an establishing subunit, configured to establish a target triangle by taking a left eye position $p_1$ in the positions of the eyes, a right position $p_2$ in the positions of the eyes and the position $p_3$ of the nose as vertexes;
a third calculating subunit, configured to calculate side lengths $D_{ij}$ of the target triangle according to formula $D_{ij}=\|p_i-p_j\|^{1/2}$;
a fourth calculating subunit, configured to calculate proportions $r_{ij}$ among the side lengths of the target triangle according to formula $$r_{ij} = \frac{D_{ik}}{D_{jk}};$$

a fifth calculating subunit, configured to calculate a cosine value $\cos(\alpha_{ij})$ of each interior angle of the target triangle is calculated according to formula $$\cos(\alpha_{ij}) = \frac{D_{ij}^2 + D_{ik}^2 + D_{jk}^2}{2D_{ij}D_{ik}};$$

a second judging subunit, configured to judge whether $P_{final} < T$ is true or not, wherein $$P_{final} = \sum_{i \neq j \in \{1,2,3\}} \frac{N(D_{ij}, \mu_{ij}, \sigma_{ij})}{\sigma_{ij}} + \sum_{i \neq j \neq k \in \{1,2,3\}} \frac{N\left(\frac{D_{ij}}{D_{ik}}, \mu_{ijk}, \sigma_{ijk}\right)}{\sigma_{ijk}} +$$

$$\sum_{i \neq j \neq k \in \{1,2,3\}} \frac{N\left(\frac{D_{ij}^2 + D_{ik}^2 - D_{jk}^2}{2D_{ij}D_{ik}}, \mu'_{ijk}, \sigma'_{ijk}\right)}{\sigma'_{ijk}}, \frac{N(D_{ij}, \mu_{ij}, \sigma_{ij})}{\sigma_{ij}}$$

is Gaussian distribution of $$D_{ij} - \| p_i - p_j \|^{\frac{1}{2}}, \frac{N\left(\frac{D_{ij}}{D_{ik}}, \mu_{ijk}, \sigma_{ijk}\right)}{\sigma_{ijk}}$$

is Gaussian distribution of $$r_{ij} = \frac{D_{ik}}{D_{jk}}, \frac{N\left(\frac{D_{ij}^2 + D_{ik}^2 - D_{jk}^2}{2D_{ij}D_{ik}}, \mu'_{ijk}, \sigma'_{ijk}\right)}{\sigma'_{ijk}}$$

is Gaussian distribution of $$\cos(\alpha_{ij}) = \frac{D_{ij}^2 + D_{ik}^2 + D_{jk}^2}{2D_{ij}D_{ik}},$$

and T is a preset value;

a second determining subunit, configured to, under the condition that $P_{final} < T$ is determined to be true, determine the left eye position as a symmetry point of the right eye position about the facial symmetry axis, or determine the right eye position as a symmetry point of the left eye position about the facial symmetry axis, wherein the establishing subunit is further configured to re-establish a target triangle until the judging subunit judges that $P_{final} \geq T$.

* * * * *